United States Patent
Singh et al.

(10) Patent No.: US 9,413,615 B1
(45) Date of Patent: Aug. 9, 2016

(54) TRAP FILTERING WITHIN A DEVICE MANAGEMENT PROTOCOL

(75) Inventors: Vivek Singh, Mathura (IN); Subodh Kumar, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 516 days.

(21) Appl. No.: 13/411,248

(22) Filed: Mar. 2, 2012

(51) Int. Cl.
G06F 15/177 (2006.01)
H04L 12/24 (2006.01)

(52) U.S. Cl.
CPC .................... *H04L 41/22* (2013.01)

(58) Field of Classification Search
CPC .................................................. G06F 21/218
USPC .................................................. 709/220, 223
See application file for complete search history.

(56) References Cited

U.S. PATENT DOCUMENTS

| | | | |
|---|---|---|---|
| 5,802,309 A | 9/1998 | Cook et al. | |
| 5,828,830 A * | 10/1998 | Rangaraian et al. | 714/48 |
| 5,960,176 A * | 9/1999 | Kuroki et al. | 709/223 |
| 6,058,445 A * | 5/2000 | Chari | G06F 9/4411 |
| | | | 709/223 |
| 6,167,403 A * | 12/2000 | Whitmire et al. | 709/223 |
| 6,182,157 B1 * | 1/2001 | Schlener | H04L 41/0213 |
| | | | 709/202 |
| 6,253,243 B1 * | 6/2001 | Spencer | 709/224 |
| 6,351,773 B1 * | 2/2002 | Fijolek et al. | 709/228 |
| 6,363,421 B2 * | 3/2002 | Barker et al. | 709/223 |
| 6,366,926 B1 * | 4/2002 | Pohlmann et al. | |
| 6,574,662 B2 | 6/2003 | Sugiyama et al. | |
| 6,854,011 B2 | 2/2005 | Kim | |
| 6,868,450 B1 * | 3/2005 | Lucovsky | 709/229 |
| 7,133,912 B1 * | 11/2006 | Gary | 709/224 |
| 7,143,153 B1 * | 11/2006 | Black et al. | 709/223 |
| 7,275,097 B2 * | 9/2007 | Peake et al. | 709/223 |
| 7,310,664 B1 * | 12/2007 | Merchant et al. | 709/220 |
| 7,310,670 B1 | 12/2007 | Walbeck et al. | |

(Continued)

FOREIGN PATENT DOCUMENTS

| | | |
|---|---|---|
| EP | 0831617 A2 | 3/1998 |
| EP | 0831617 B1 | 5/2006 |
| FR | 2816416 A1 | 5/2002 |

OTHER PUBLICATIONS

Harrington et al. "An Architecture for Describing Simple Network Management Protocol (SNMP) Management Frameworks", RFC 3411, The Internet Society, Dec. 2002, 63 pgs.

(Continued)

*Primary Examiner* — Kevin Bates
*Assistant Examiner* — Clarence McCray
(74) *Attorney, Agent, or Firm* — Shumaker & Sieffert, P.A.

(57) ABSTRACT

An example device includes a processor that provides an execution environment for a management agent, and a data repository configured to store configuration information. The management agent is operable to retrieve configuration information that specifies one or more trap conditions and one or more filter criteria from the data repository, detect that at least one of the one or more trap conditions is met, generate a message that includes a set of variable identifiers and associated variable values based on the one or more met trap conditions, determine whether at least one of the variable identifiers and associated value pairs included in the generated messages meet at least one of the filter criteria by at least comparing a variable value of a respective filter criteria to the variable value of the generated message, and selectively send the generated message to a device management system based on the comparison.

20 Claims, 4 Drawing Sheets

(56) References Cited

U.S. PATENT DOCUMENTS

| | | | |
|---|---|---|---|
| 7,430,594 B2* | 9/2008 | Krupczak | 709/223 |
| 7,496,685 B2* | 2/2009 | Chen et al. | 709/245 |
| 7,593,999 B2 | 9/2009 | Nathanson | |
| 7,600,147 B2* | 10/2009 | Agashe | 714/4.1 |
| 7,653,709 B1 | 1/2010 | Miakinen | |
| 7,752,024 B2 | 7/2010 | Ball et al. | |
| 7,779,102 B2 | 8/2010 | Nogawa | |
| 8,037,205 B2* | 10/2011 | Chong et al. | 709/246 |
| 8,112,512 B2 | 2/2012 | Mendiratta et al. | |
| 8,156,246 B2* | 4/2012 | Short et al. | 709/239 |
| 8,244,886 B2* | 8/2012 | Short | H04L 63/08 709/203 |
| 8,266,269 B2* | 9/2012 | Short et al. | 709/223 |
| 8,364,806 B2* | 1/2013 | Short et al. | 709/223 |
| 8,370,477 B2* | 2/2013 | Short et al. | 709/223 |
| 8,549,119 B1* | 10/2013 | Singh | H04L 41/0853 709/222 |
| 8,549,919 B2 | 10/2013 | Gunthner et al. | |
| 8,560,609 B2 | 10/2013 | Nathanson | |
| 8,799,437 B1 | 8/2014 | Kumbhari | |
| 2001/0052006 A1 | 12/2001 | Barker et al. | |
| 2001/0052010 A1* | 12/2001 | Kim | H04L 41/046 709/224 |
| 2002/0042848 A1 | 4/2002 | Takats | |
| 2002/0091815 A1* | 7/2002 | Anderson et al. | 709/223 |
| 2002/0091824 A1* | 7/2002 | Anderson et al. | 709/225 |
| 2002/0091944 A1* | 7/2002 | Anderson et al. | 713/201 |
| 2002/0150050 A1 | 10/2002 | Nathanson | |
| 2002/0188568 A1* | 12/2002 | Nickolaisen et al. | 705/52 |
| 2003/0023605 A1 | 1/2003 | Sternin et al. | |
| 2003/0041134 A1 | 2/2003 | Sugiyama et al. | |
| 2003/0069963 A1 | 4/2003 | Jayant et al. | |
| 2003/0105861 A1* | 6/2003 | Lee | H04L 41/0213 709/224 |
| 2003/0126195 A1* | 7/2003 | Reynolds et al. | 709/203 |
| 2004/0006619 A1* | 1/2004 | Syed | H04L 41/0213 709/224 |
| 2004/0139193 A1* | 7/2004 | Refai et al. | 709/224 |
| 2005/0015485 A1* | 1/2005 | Keefer et al. | 709/224 |
| 2005/0039188 A1* | 2/2005 | Agashe | 719/310 |
| 2005/0198238 A1 | 9/2005 | Sim et al. | |
| 2005/0228885 A1 | 10/2005 | Winfield et al. | |
| 2006/0190553 A1 | 8/2006 | Kojima | |
| 2006/0235971 A1 | 10/2006 | McCloghrie et al. | |
| 2007/0244614 A1 | 10/2007 | Nathanson | |
| 2008/0043634 A1 | 2/2008 | Wang et al. | |
| 2008/0195745 A1 | 8/2008 | Bowra et al. | |
| 2009/0098892 A1 | 4/2009 | Trogolo et al. | |
| 2010/0023581 A1 | 1/2010 | Lahav | |
| 2010/0030423 A1 | 2/2010 | Nathanson | |
| 2010/0260066 A1 | 10/2010 | August et al. | |
| 2011/0081888 A1 | 4/2011 | Waniss | |
| 2011/0138291 A1* | 6/2011 | Twiddy et al. | 715/735 |
| 2011/0231546 A1 | 9/2011 | Nathanson | |
| 2013/0346574 A1 | 12/2013 | Singaraju et al. | |

OTHER PUBLICATIONS

Guillebert "Advanced config questions about Event Translator and Varbind Filtering", available at http://opennms.530661.n2.nabble.com/Advanced-config-questions-about-Event-Translator-and-Varbind-Filtering-td5956145.html accessed Nov. 17, 2011, 9 pgs.

"openNMS" Event Configuration How-To—OpenNMS The OpenNMS Project, available at http://www.opennms.org/wiki/Event_Configuration_How-To, accessed Nov. 15, 2011, 17 pgs.

"[Patch] Allow varbind filtering based on varbind OID instead of varbind number" OpenNMS, available at http://issues.opennms.org/browse/NMS-4377, accessed Nov. 17, 2011, 2 pgs.

Case et al., "Protocol Operations for version 2 of the Simple Network Management Protocol (SNMPv2)," RFC 1448, Network Working Group, The IETF Trust, Apr. 1993, 36 pp.

Godura et al., "Use of Control Variables to Convey Protocol Semantics in SNMP," Proceedings of DSOM '95, 6th IFIP/IEEE Workshop on Distributed Systems: Operations and Management, Oct. 1995, 11 pp.

Jagadish et al., "Network Management Traffic Optimization," Proc. of 14th National Conf. on Communications, NCC-2008, IIT Bombay, Feb. 1-3, 2008, 5 pp.

McCloghrie et al., "Structure of Management Information Version 2 (SMIv2)," RFC 2578, Network Working Group, The Internet Society, Apr. 1999, 43 pp.

McCloghrie et al., "Management Information Base for Network Management of TCP/IP-based internets: MIB-II," RFC 1213, Network Working Group, Mar. 1991, 66 pp.

Presuhn et al., "Version 2 of the Protocol Operations for the Simple Network Management Protocol (SNMP)," RFC 3416, Network Working Group, The Internet Society, Dec. 2002, 32 pp.

Schonwalder et al., "SNMP Traffic Analysis: Approaches, Tools, and First Results," 10th IFIP/IEEE International Symposium on Integrated Network Management, May 21, 2007, 10 pp.

Schonwalder, "Extending SNMP to Support Bulk MIB Data Transfers," presented on behalf of the Network Management Research Group (NMRG), retrieved from http://www.irtf.org/charters/management.html, Jul. 2000, 9 pp.

Sprenkels et al., "Bulk Transfers of MIB Data," Communication Systems Division (SSC), retrieved from http://infoscience.epfl.ch/record/198/files/TR99_009.pdf, Mar. 1999, 11 pp.

U.S. Appl. No. 12/970,509, by Vivek Singh, filed Dec. 16, 2010.
U.S. Appl. No. 13/183,198, by Vivek Singh, filed Jul. 14, 2011.

* cited by examiner

| TOT Index | Trap Oid | Row Status |
|---|---|---|
| 1 | linkDown | Active |
| 2 | linkUp | Active |
| 3 | vrrpTrapAuthFailure | Active |

FIG. 3B — 60

| TOT Index | FT Index | Varbind Oid | Value Type | Value | Operator | Row Status |
|---|---|---|---|---|---|---|
| 1 | 1 | ifName | 2 | fe-1/0/3 | 4 | Active |
| 2 | 2 | ifName | 2 | ge-* | 7 | Active |
| 3 | 3 | vrrpTrapPacketSrc | 2 | 192.168.3.5 | 1 | Active |
| 3 | 4 | vrrpTrapErrorType | 1 | 1 | 2 | Active |

FIG. 3C — 80

| RT Index | FT Index1 | FT Index2 | Operator | Row Status |
|---|---|---|---|---|
| 1 | 3 | 4 | 5 | Active |

FIG. 4

TRAP FILTERING WITHIN A DEVICE MANAGEMENT PROTOCOL

TECHNICAL FIELD

This disclosure relates to computer networks and, more particularly, to techniques for configuring and managing network devices.

BACKGROUND

A computer network is a collection of interconnected computing devices that can exchange data and share resources. In a packet-based network, such as an Ethernet network, the computing devices communicate data by dividing the data into small blocks called packets, which are individually routed across the network from a source device to a destination device. A variety of intermediate devices operate to route the packets between the computing devices. For example, a computer network may include routers, switches, gateways, firewalls, and a variety of other devices to provide and facilitate network communication.

These network devices typically include mechanisms, such as management interfaces, for locally or remotely configuring the devices. By interacting with the management interface, various clients, such as human users, automated scripts or network management systems, can perform configuration tasks as well as collect and view operational data of the managed devices. For example, the clients may configure interface cards of the device, adjust parameters for supported network protocols, specify physical components within the device, modify routing information maintained by a router, access software modules and other resources residing on the device, and perform other configuration tasks. In addition, the clients may receive information either by polling the managed device or by receiving asynchronous events from the devices. In this way, the clients may allow a user to view current operating parameters, system logs, information related to network connectivity, network activity or other status information from the devices as well as view and react to event information received from the devices.

The Simple Network Management Protocol (SNMP) is a standard defined by the Internet Engineering Task Force (IETF) for managing network devices. SNMP uses a design that incorporates one or more management information bases (MIBs) within a managed device to describe and expose internal data elements of the managed device. Management devices, such as computer consoles and network management systems, store data to and read data from the SNMP MIBs of the devices to configure, monitor and generally control operation of the devices. For example, an SNMP agent executing on the managed device accesses the device's internal SNMP MIBS and exchanges network management information with an SNMP manager running on the network management system or other host. The SNMP agent responds to requests for information and directives from the SNMP manager.

In many cases, the managed devices may be configured to detect when certain events (e.g., errors) occur within the managed device and send information about the events to management devices. Conventionally, each time a managed device detects such an event, a message that includes all of the information about the event and/or managed device is generated and sent to the management devices. For example, SNMP traps enable an SNMP agent to notify the network management system of significant events by way of an unsolicited SNMP message.

SUMMARY

In general, techniques are described that enable a management device to interact with a management agent of a managed device to define and configure filtering mechanisms to selectively transmit only a subset of the information associated with a detected event. That is, rather than providing all of the information associated with the detected event to the management device, the management agent may be pre-configured to filter out certain undesired information in response to particular events. In one example implementation, the management device configures parameters on the managed devices to specify a group of trap conditions, criteria on which to filter certain information generated in response to detection of the trap conditions, and to identify the intended recipients for the filtered set of information.

The techniques may be applied to network management systems and managed devices to reduce network traffic between the network management systems and the managed devices. Moreover, the techniques may reduce the system load of the management devices. In one example, the techniques may be applied using simple network management protocol (SNMP) management device interacting with an SNMP software agent executing on an SNMP managed device. The SNMP agent may be configured to filter undesired information from a set of information generated in response to the detection of a trap condition. That is, the SNMP agent may be configured to prevent the information from being sent to the SNMP management device such that no undesired information is sent to the SNMP management device.

In one embodiment, a method includes receiving a set of configuration information, with a management agent executing on a network device, wherein the set of configuration information specifies one or more trap conditions and one or more filter criteria, and wherein each of the one or more filter criteria specifies a variable identifier, a variable value associated with the variable identifier, and an operator, and detecting, with the management agent, that at least one of the one or more trap conditions is met. The method also includes generating, with the management agent, a message based on the at least one trap condition that is met, wherein the message includes a set of variable identifiers and associated variable values from a management information base (MIB) storing configuration information for the network device, determining, with the management agent, whether at least one of the variable identifiers and associated value pairs included in the generated message meet at least one of the one or more filter criteria by at least comparing the variable value associated with the variable identifier of a respective filter criteria to the variable value associated with the variable identifier of the generated message that corresponds to the variable identifier of the respective filter criteria in a manner consistent with the operator, and selectively sending the generated message to a device management system based on the comparison.

In another embodiment, a network device includes a processor that provides an execution environment for a management agent, and a data repository configured to store configuration information. The management agent is operable to retrieve a set of configuration information from the data repository, wherein the configuration information specifies one or more trap conditions and one or more filter criteria, and wherein each of the one or more filter criteria specifies a variable identifier, a variable value associated with the variable identifier, and an operator, detect that at least one of the one or more trap conditions is met, generate a message based on the at least one trap condition that is met, wherein the message includes a set of variable identifiers and associated variable values from the data repository, determine whether at least one of the variable identifiers and associated value pairs included in the generated messages meet at least one of the one or more filter criteria by at least comparing the variable value associated with the variable identifier of a respective filter criteria to the variable value associated with the variable identifier of the generated message that corresponds to the variable identifier of the respective filter criteria in a manner consistent with the operator, and selectively send the generated message to a device management system based on the comparison.

In another embodiment, a computer-readable storage medium is encoded with instructions that cause one or more programmable processors of a network device to receive a set of configuration information that specifies one or more trap conditions and one or more filter criteria, wherein the set of configuration information specifies one or more trap conditions and one or more filter criteria, and wherein each of the one or more filter criteria specifies a variable identifier, a variable value associated with the variable identifier, and an operator, detect that at least one of the one or more trap conditions is met, and generate a message based on the at least one trap condition that is met, wherein the message includes a set of variable identifier and value pairs from a management information base (MIB) storing configuration information for the network device. The instructions also cause the programmable processors to determine whether at least one of the variable identifiers and associated value pairs included in the generated messages meet at least one of the one or more filter criteria by at least comparing the variable value associated with the variable identifier of a respective filter criteria to the variable value associated with the variable identifier of the generated message that corresponds to the variable identifier of the respective filter criteria in a manner consistent with the operator, and selectively send the message from the network device to a device management system based on the comparison.

The techniques described herein may provide certain advantages. The techniques may, for example, enable the SNMP agent executing on the managed network device to reduce the amount of information sent from the managed device to the management devices. By preventing the undesired information from being sent to management devices, the management devices receive fewer PDUs, which, in turn, reduces the number of computational cycles that the management devices need to decode PDUs. In this manner, the amount of network bandwidth and the amount of management device resources used in response to detecting trap conditions may be reduced.

The details of one or more embodiments are set forth in the accompanying drawings and the description below. Other features, objects, and advantages will be apparent from the description and drawings, and from the claims.

DETAILED DESCRIPTION

Figure 1:
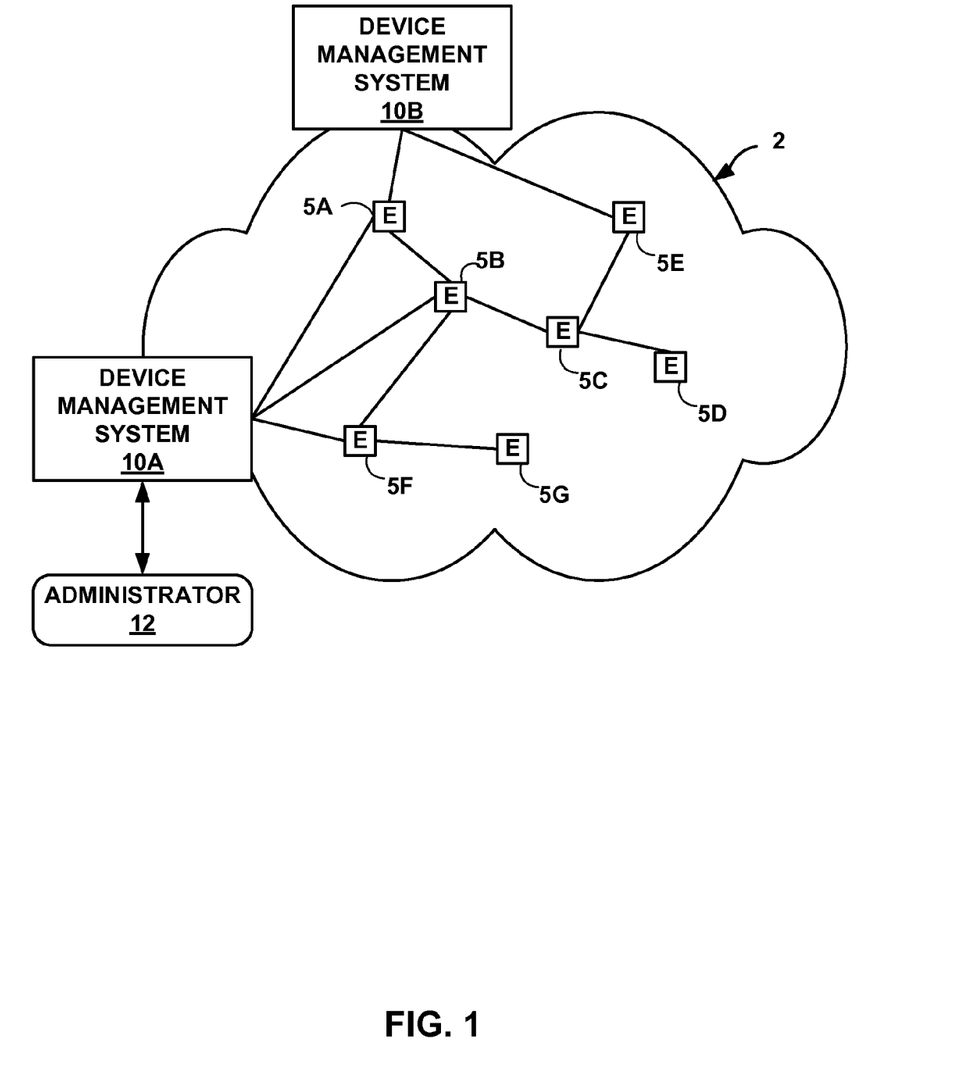
FIG. 1 is a block diagram illustrating elements of an example network that autonomously provide event information to device management systems in accordance with one or more aspects of this disclosure.

FIG. 1 is a block diagram illustrating elements of an enterprise network 2 that are managed using device management systems 10A and 10B in accordance with one or more aspects of this disclosure. Even though two device management systems 10A and 10B (collectively, "device management systems 10") are illustrated in FIG. 1, any number of device management systems 10 may be used to manage elements of enterprise network 2. Managed devices 5A-5G (collectively, "managed devices 5") of enterprise network 2 include network devices interconnected via communication links to form a communication topology in order to exchange resources and information. Even though seven managed devices 5 are illustrated in FIG. 1, any number of managed devices 5 may be included in enterprise network 2. Managed devices 5 may include, for example, routers, switches, gateways, bridges, hubs, servers, firewalls or other intrusion detection systems (IDS) or intrusion prevention systems (IDP), computing devices, computing terminals, printers, other network devices, or a combination of such devices. Enterprise network 2 supports the exchange of protocol data units (PDUs) for transmitting data among managed devices 5 and device management systems 10. Such PDUs may comprise, for example, Internet Protocol (IP) packets Ethernet datagrams, and Asynchronous Transfer Mode (ATM) cells. Communication links interconnecting managed devices 5 may be physical links (e.g., optical, copper, and the like) or wireless.

Enterprise network 2 may represent an enterprise network, a campus network, a service provider network, or other autonomous system for example. Thus, while described with respect to an enterprise network, the techniques of this disclosure are applicable to other network types, public and private, including local area networks (LANs), virtual local area networks (VLANs), virtual private networks (VPNs), and the like. Enterprise network 2 may be coupled to one or more additional private or public networks, e.g., the Internet (not shown).

Device management systems 10 are communicatively coupled to managed devices 5 via enterprise network 2. Device management systems 10 may be coupled either directly or indirectly to the various managed devices 5. Once managed devices 5 are deployed and activated, administrator 12 may use device management systems 10 to manage the managed devices 5 using a management protocol designed for management of configuration data within managed devices 5, such as the Simple Network Management Protocol (SNMP), or the Network Configuration (NETCONF) protocol, or a derivative thereof, such as the Juniper Device Management Interface, to perform the configuration.

In common practice, device management systems 10 and managed devices 5 managed by device management systems 10 are centrally maintained by an IT group of the enterprise and are collectively referred to as an element management system (EMS) or a network management system (NMS). Administrator 12 interacts with one or more of device management systems 10 to remotely monitor and configure managed devices 5. For example, administrator 12 may receive alerts from device management system 10A regarding any of managed devices 5, view configuration data of managed devices 5, modify the respective configuration data of managed devices 5, add new network devices to network 2, remove existing network devices from network 2, or otherwise manipulate the network 2 and network devices therein.

Administrator 12 uses device management systems 10 to configure managed devices 5 to specify certain operational characteristics that further the objectives of administrator 12. For example, administrator 12 may specify for a managed device 5 a particular operational policy regarding security, device accessibility, traffic engineering, quality of service (QoS), network address translation (NAT), packet filtering, packet forwarding, rate limiting, or other policies. Device management systems 10 uses a network management protocol, such as SNMP, designed for management of configuration data within network devices or monitoring and retrieving operation data from managed devices 5. SNMP allows device management systems 10 to traverse and modify management information bases (MIBs) within each of devices 5 that describes the structure of the management data of the device by using a namespace that contains object identifiers (OIDs). Each OID represents, within the particular managed device 5, a managed object that identifies a specific characteristic about the managed device. Managed objects include one or more object instances, also represented by an OID in a MIB, that each identifies a variable of management data (e.g., a operational/configuration parameter) within the network device that can be read or set by the client via SNMP. Further details regarding SNMP can be found in Harrington et al., RFC 3411, "An Architecture for Describing Simple Network Management Protocol (SNMP) Management Frameworks," Network Working Group, the Internet Engineering Task Force draft, December 2002, available at http://tools.ietf.org/html/rfc3411, the entire contents of which are incorporated herein by reference.

Device management systems 10 may issue commands in accordance with the network management protocol to monitor or control managed network devices 5 (e.g., SNMP GetRequest, GetNextRequest, or SetRequest commands). In an example operation, device management system 10A issues a command to direct an SNMP agent executing on one of devices 5 (e.g., device 5A) to retrieve a set of management information. The management information may include configuration and/or operational information. The command includes a request identifier that uniquely identifies that particular request associated with the command. Device 5A receives the request for the set of management information in the form of variable bindings ("varbinds"). The varbinds include a set of name-value pairs of management objects, where the name is the object identifier (OID). The SNMP agent executing on device 5A retrieves values for the set of requested OIDs and returns the OIDs and values in one or more response packet data units (PDUs). That is, the SNMP agent uses the OIDs to select object instances within the MIB, where each of the object instances is bound to a variable (e.g., a configurable parameter or status data unit) within the internal data space of the control software executing on the network device. In this way, the SNMP agent utilizes the structures in the MIB to allow device management system 10A to read or set any of the specific data elements of the internal data space that are described by the MIB and thereby exposed to the SNMP agent by way of the MIB.

In another example operation, device management system 10 may send a message to device 5A to configure device 5A to define SNMP traps to report events occurring on device 5A in an SNMP message. In general, an SNMP trap is an unsolicited message sent by a managed device to one or more network management systems. A MIB of the managed device contains trap objects and associated trap parameter objects that collective define or more SNMP traps for device 5A. An SNMP trap is thus associated with a respective trap OID and one or more parameter OIDs. When device 5A detects that one or more trap conditions, as defined by the trap OID and one or more parameter OIDs, the SNMP trap is triggered (alternatively referred to herein as "fired") upon occurrence of an event reported by a managed object represented by an OID within the MIB of device 5A (i.e., a trap condition). When the SNMP trap is triggered, device 5A generates an SNMP message based on the SNMP trap that was triggered. For example, if device 5A is configured with an SNMP trap having a linkDown OID. The linkDown trap is associated with a plurality of varbinds, including ifIndex, ifAdminStatus, and ifOperStatus. When an event occurs that matches triggers the linkDown trap, device 5A generates an SNMP message that includes the linktrap OID as well as varbind and value pairs for each of the varbinds associated with the trap. Device 5A may send the generated SNMP message, including all of the varbind and value pairs, to one or more of device management systems 10.

In some instances, administrator 12 may not want to view, log, or otherwise maintain information about all of the instances of a particular trap OID. For example, administrator 12 may only be interested when one of a subset of the interfaces of device 5A triggers the linkDown trap. In these instances, any information sent by device 5A to device management systems 10 that is not wanted by administrator 12 may be discarded by device management systems 10. However, device management systems 10 may still receive the complete SNMP message, including the unwanted information, and may still decode the received SNMP message, which results in wasted bandwidth and system resource usage.

In accordance with techniques of the present disclosure, the SNMP agent executing on managed device 5A may prevent unsolicited SNMP trap messages that include unwanted varbind and value pairs from being sent to device management systems 10. Managed device 5A may be configured with filter information, e.g., parameters, that may be applied to the SNMP trap messages that are automatically generated by the SNMP protocol in response to determining that one or more trap conditions were met. The filter information may include trap OIDs, varbind OIDs, values on which to filter the varbind and value pairs, and operators to use when filtering the varbind and value pairs, as non-limiting examples. Examples of filter information are discussed in more detail with respect to FIGS. 3A-3C.

The SNMP protocol includes program code that is well established, having been tested and stable for a significant period of time. The long-standing program code automatically generates the SNMP trap messages in response to determining that a trap condition is met. By filtering the SNMP trap messages after the SNMP messages are generated, the SNMP trap message filtering techniques described herein may be easily applied without requiring substantial modification to the stable SNMP program code, thereby taking advantage of the significant amount of testing and proven stability of the long-standing SNMP program code.

In this manner, the load on device management systems 10 as well as the amount of network traffic between device management systems 10 and managed devices 5 may be reduced. For example, techniques of this disclosure may, in various instances, enable managed devices 5 prevent SNMP messages generated in response to the detection of certain trap conditions from being sent to device management systems 10. By configuring managed devices 5 to suppress certain SNMP trap messages that include undesired varbind and value pairs, fewer SNMP messages may be sent from managed devices 5 to device management system 10.

Figure 2:
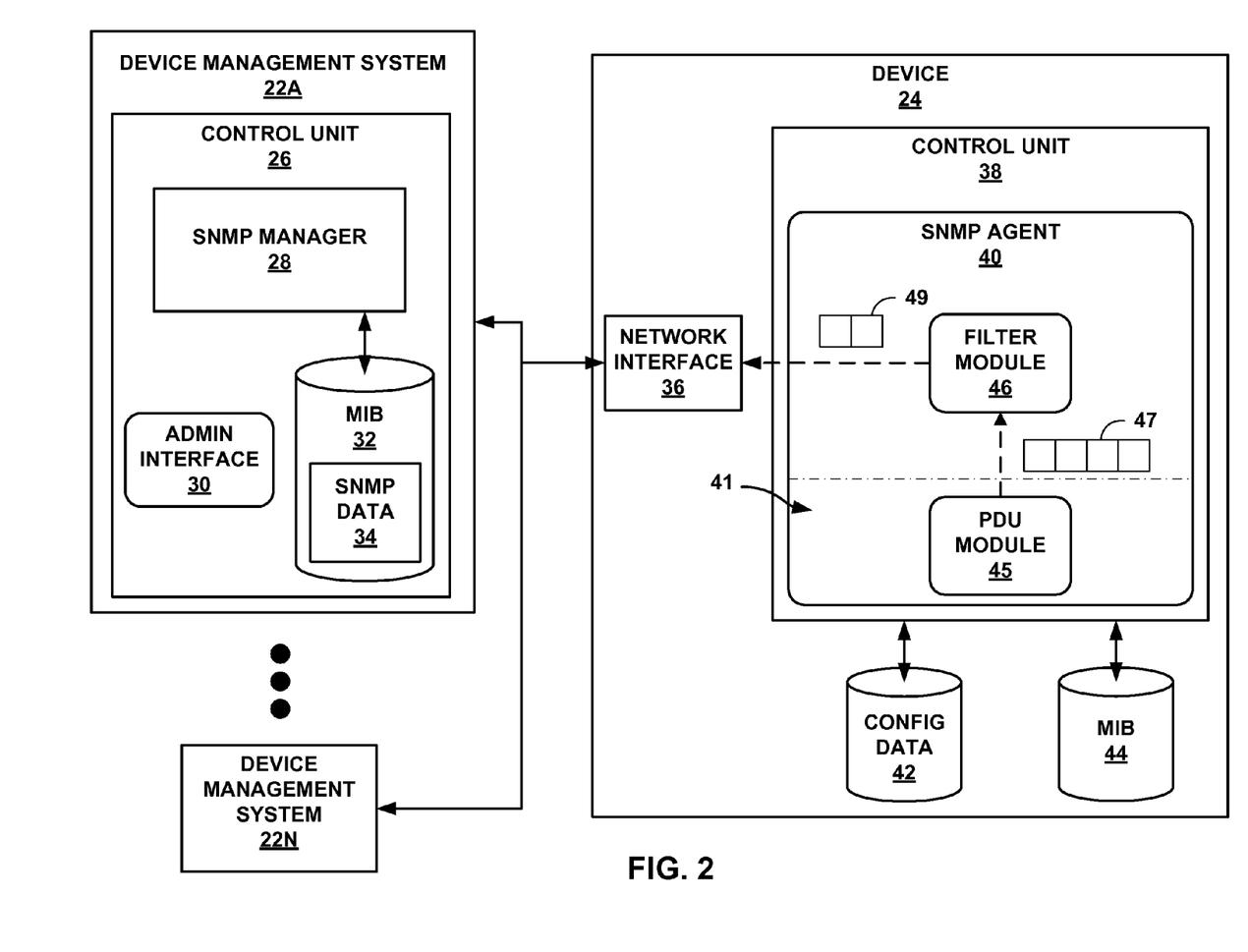
FIG. 2 is a block diagram illustrating an example set of network management devices that configure an example managed device to filter event information in accordance with one or more aspects of this disclosure.

FIG. 2 is a block diagram illustrating example embodiments of device management systems 22A-22N that configure managed device 24 (hereinafter, "device 24") to filter event information in accordance with one or more aspects of this disclosure. Device management systems 22A-22N (collectively, "device management systems 22) manage managed device 24 using a management protocol, such as SNMP, for exchanging management protocol messages over a communication link. While described with respect to one particular protocol for managing network devices (e.g., SNMP), techniques of this disclosure may apply to any network management protocol by which a management application requests management information from a managed device and by which the managed device respond to the management information request by providing the management application with the requested management information.

Each of device management systems 22A-22N (collectively, "device management systems 22") may be an example of device management systems 10 of FIG. 1 and managed device 24 may be an example of a managed device 5 of FIG. 1. In the example embodiment illustrated in FIG. 2, device management system 22A includes control unit 26 and managed device 24 includes network interface 36 and control unit 38.

Each of control units 26 and 38 may include one or more processors that execute software instructions, such as those used to define a software or computer program, stored to a computer-readable storage medium, such as a storage device (e.g., a disk drive, or an optical drive), or memory (such as Flash memory, random access memory or RAM) or any other type of volatile or non-volatile memory, that stores instructions to cause a programmable processor to perform the techniques described herein. Alternatively, control unit 38 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

Control unit 26 provides an operating environment for SNMP manager 28, administrative interface (ADMIN INTERFACE) 30 and management information base (MIB) 32. MIB 32 is a hierarchy of information that specifies managed objects in device 24 managed by SNMP manager 28. MIB 32 includes managed object instances that each represent an aspect of SNMP managed data (SNMP DATA) 34, which may include, for example, configuration or descriptive data for device 24. SNMP manager 28 represents an exemplary instance of an SNMP management application or, more generally, a network management application. SNMP manager 28 is one example of a network management module. In one example, SNMP manager 28 monitors and controls one or more of managed devices 5 of FIG. 1.

Managed device 24 may be any device having one or more processors and a memory, and that is capable of executing one or more software processes, including SNMP agent 40, that operates in accordance with a network management protocol, such as SNMP. Device 24 stores objects that represent device 24 resources in a structured form within MIB 44. Each object is identifiable by a unique object identifier (OID). The specific characteristics, or "managed objects," of device 24 typically include resources, parameters, settings, or descriptors for a component, software objects' attributes, system attributes, or global data, for instance. Examples of managed objects include network interfaces of device 24, data describing the relationships between multiple sub-layers of network interfaces, and data describing and providing status information for IEEE 802.3 Medium Attachment Units (MAUs). MIB 44 may store objects in the form of one or more tables, databases, linked lists, radix trees, or other suitable data structure.

A network operator or other administrator interacts with administrative interface 30 to direct SNMP manager 28 to manage device 24 in a specified manner, e.g., to modify the configuration of device 24 or to monitor the status or performance of device 24, by requesting variable information available from device 24 according to MIB 32. For example, the operator may enter commands to view and modify SNMP data 34 and ultimately to deploy the configuration data to MIB 44 of device 24 as operational configuration data of the device. The operation configuration data may include SNMP traps that specify one or more trap conditions as well as filter information that may be applied to filter the sending of SNMP messages generated in response a trap condition being detected by SNMP agent 40. As another example, the operator may enter commands to retrieve the operational data from MIB 44 of device 24. MIB 32 and SNMP data 34 may each be stored in the form of one or more tables, databases, linked lists, radix trees, or other suitable data structure.

Control unit 38 provides an operating environment for SNMP agent 40, configuration data (CONFIG DATA) 42, and MIB 44. Device 24 stores management data in a structured form, such as MIB 44. MIB 44 may store management data in the form of one or more tables, databases, linked lists, radix trees, or other suitable data structure. In some examples, configuration data 42 may be included within MIB 44 and may include tables or other data structures that conform to the structure of MIB 44, thereby minimizing the changes required to implement the techniques of this disclosure and increasing the ease with which the techniques of this disclosure may be deployed. SNMP agent 40 may operate as a software daemon executing within control unit 38. In some examples, SNMP agent 40 includes a set of sockets for receiving SNMP requests, another set of sockets for sending SNMP responses and another set of sockets for sending SNMP messages generated in response to determining that one or more trap conditions have been met (alternatively referred to herein as "SNMP traps" or "SNMP trap messages" or "SNMP trap PDUs"). The SNMP trap is triggered upon occurrence of the event reported by a managed object represented by an OID within MIB 44 of device 24 (i.e., a trap condition). When SNMP agent 40 determines that one or more trap conditions have been met (e.g., an interface has gone down), SNMP agent 40 automatically generates the SNMP trap message (i.e., a trap PDU) that includes varbind and value pairs, which is then sent to one or more of device management systems 22. More specifically, SNMP agent 40, as shown in FIG. 2, includes long-standing program code 41 and filter module 46. Long-standing program code 41 includes PDU module 45, which is configured to automatically generate SNMP trap messages 47 upon detection of one or more trap conditions.

Techniques of this disclosure may reduce the number SNMP trap messages sent to device management systems 22 by applying filters to one or more varbind and value pairs (e.g., by filter module 46) to prevent the filtered out SNMP trap messages from being sent by SNMP agent 40. By reducing the number of SNMP trap messages sent by SNMP agent 40, the amount of network bandwidth used for sending SNMP trap messages may be reduced and the amount of work required process SNMP trap messages received by device management systems 22 may be reduced.

In accordance with the techniques of this disclosure, an operator may enter commands using administrative interface 30 of device management system 22A to cause device 24 to store configuration data in configuration data 42 (e.g., by causing SNMP manager 28 to send a SET command to SNMP agent 40, where the SET command includes the configuration information). Configuration data 42 is one example of a data repository configured to store configuration information for controlling the operation of SNMP agent 40. That is, the configuration information stored in configuration data 42 may be set using SNMP and it is this configuration information that controls how SNMP agent 40 filters out various varbind and value pairs for each OID that corresponds to an SNMP trap configured in MIB 44.

In one example, configuration data 42 may store configuration information that causes SNMP agent 40 to filter the content of SNMP trap messages automatically generated by SNMP agent 40 in response to one or more SNMP traps being triggered. More specifically, the filter configuration information stored in configuration data 42 may include one or more trap OIDs, varbind OIDs, filter values, filter value types, and filter operators, or any combination thereof. Further details of configuration data 42 are described with respect to FIGS. 3A-3C.

Filter module 46 of SNMP agent 40 is configured to filter SNMP trap messages 47 based on the filter configuration information stored in configuration data 42. When an operator configures SNMP agent 40 to filter SNMP trap messages, filter module 46 filters the SNMP trap messages based at least in part on the varbind and value pairs included in the SNMP trap messages using the filter conditions specified in configuration data 42. Once SNMP manager 28 configures SNMP agent 40, filter module 46 may automatically perform the filtering on the SNMP trap messages 47 generated by PDU module 45, resulting in remaining SNMP trap messages 49 being sent to one or more of device management systems 22. By implementing filter module 46 outside of long-standing program code 41, the techniques of this disclosure may be more easily implemented in conjunction with the existing SNMP standards and take advantage of the stability and familiarity of long-standing program code 41.

The filter configuration information stored in configuration data 42 may specify one or more of device management systems 22 to which SNMP agent 40 should send the SNMP trap messages. Further, each of the specified device management systems may be specifically configured to receive a different subset of the information generated when a particular SNMP trap is triggered. That is, the SNMP trap messages filtered (e.g., discarded) for one device management system (e.g., device management system 22A) may be different than the SNMP trap messages filtered for a different device management system (e.g., device management system 22N).

Figure 3A:
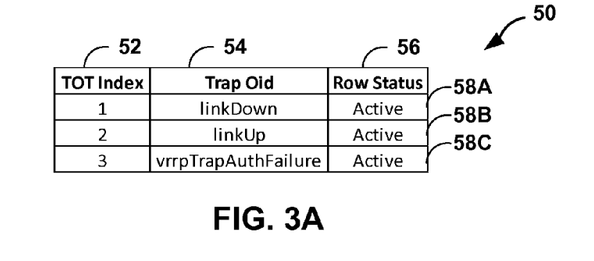
FIGS. 3A-3C are example configuration tables that may be stored by a managed network device in accordance with one or more aspects of this disclosure.
Figure 3B:
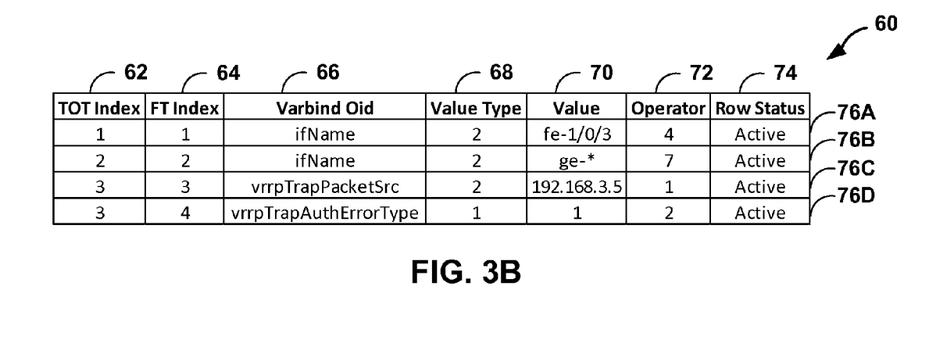
Figure 3C:
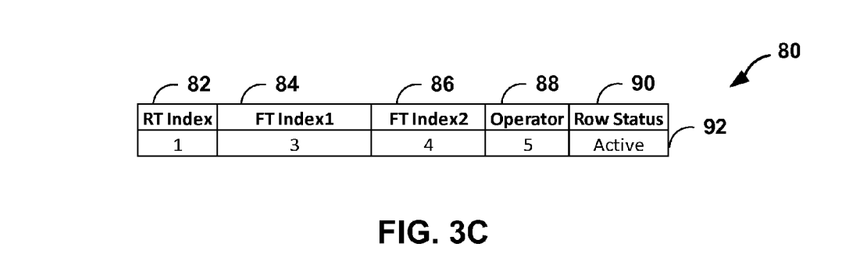

FIGS. 3A-3C illustrate example tables 50, 60, and 80 that may be stored in configuration data 42 by managed device 24 of FIG. 2, in accordance with one or more aspects of this disclosure. While illustrated and described as tables, tables 50, 60, and 80 may be implemented as object trees or other data structures. Tables 50, 60, and 80 may, therefore, include conceptual rows (as illustrated) rather than actual rows. For purposes of illustration, FIGS. 3A-3C are described below with respect to device management systems 22 and managed device 24 of FIG. 2.

Tables 50, 60, and 80 may be used by SNMP agent 40 and filter module 46 when filtering SNMP trap messages based on varbind and value pairs. FIG. 3A includes table 50 having columns 52, 54, and 56 as well as rows 58A-58C (collectively, "rows 58"). Each row 58 of table 50 stores configuration information for a trap object identifier (OID). Column 52 is a first index column configured to store a first index value. Column 54 is configured to store the OID of the trap that is to be filtered by SNMP agent 40 and filter module 46. Column 56 stores an indication as to whether filter module 46 should perform filtering on SNMP trap messages generated for the trap OID specified in the corresponding row. For example, in row 58A, column 56 stores the value "active." Therefore, when the trap having the OID "linkDown" is triggered, filter module 46 filters the generated SNMP trap message based on the information stored in tables 60 and 80. Column 56 may be utilized to manage the effective creation and deletion of conceptual rows 58 in table 50.

FIG. 3B includes table 60 having columns 62, 64, 66, 68, 70, 72 and 74 and rows 76A-76D (collectively, "rows 76"). Each row 76 of table 60 stores configuration information for a trap OID specified in one or more rows 58 of table 50. Column 52 stores a unique index value that keys to a value stored by column 62 and may indicate a corresponding relationship between one or more rows 58 of table 50 and one or more rows 76 of table 60. For example, the value "1" is stored in column 62 at row 76A. The value "1" is also stored in column 52 at row 58A. Because the values in column 62 key to column 52, the configuration information stored in row 76A may be applied to the trap OID stored in row 58A. Column 64 is a second index column configured to store a second index value that is unique within column 64. Column 66 stores the OID for a particular varbind that is associated with the corresponding trap OID specified in column 54 of table 50. For example, in row 76B, the value of column 62 is 2. The value 2 in column 62 corresponds to the value 2 in column 52 of table 50, which has a trap OID of "linkUp" stored in column 54. Thus, the value of column 66 is "ifName" is a varbind OID associated with the trap OID "linkUp."

Column 68 stores a value type code that corresponds to the type of the value stored in column 70. In the specific example of FIG. 3B, the value type code is an integer value. However, in other examples, the value type code may be a string or other type of value. The value type code may be mapped to one or more different types of values, including integer, string, varchar, float, etc. Column 70 stores the value on which the varbind OID specified in column 66 is to be filtered by filter module 46. Column 72 stores the operator code that corresponds to the operator that filter module 46 uses when comparing the value stored in column 70 and the value of the corresponds varbind OID in the generated SNMP trap message. Similar to column 68, the operator type code may be an integer value (as shown in the specific example of FIG. 3B), a string value, or any other type of value. In the example of FIG. 3B, the integer value stored by column 72 (e.g., the value "4" in row 76A) to an operator (e.g., the operator "not equal to"). One example operator type code to operator mapping is shown in table 1 below.

TABLE 1

| Operator Type Code | Operator |
|---|---|
| 1 | equal to (==) |
| 2 | greater than (>) |
| 3 | less than (<) |
| 4 | not equal to (!=) |
| 5 | logical and (&&) |
| 6 | logical or (\|\|) |
| 7 | regular expression (regexp) |

Column 56 stores an indication as to whether filter module 46 should perform filtering on SNMP trap messages generated for the varbind OID specified in the corresponding row. As shown in FIG. 3B, when the row status stored in column 74 is set to the value "active," filter module 46 determines that the varbind OID specified in column 66 of the corresponding row is to be filtered based on the value type, value, and operator stored in rows 68, 70, and 72 of the corresponding row. When the row status stored in column 74 is set to the value "inactive," filter module 46 determines that the varbind OID specified in column 66 of the corresponding row is not to be filtered based on the value type, value, and operator stored in rows 68, 70, and 72 of the corresponding row. In some examples, the row status stored in column 74 may be another value, such as "delete" that indicates that SNMP agent 40 should remove the row from the table. That is, column 74 may be utilized to manage the effective creation and deletion of conceptual rows 76 in table 60 in a manner similar to that of column 56 of table 50.

FIG. 3C includes table 80 having columns 82, 84, 86, 88, and 90 and row 92. In general, table 80 stores information that indicates a relationship between two rows 76 of table 60. Table 80 may be used by filter module 46 to build complex expressions for filtering traps. Typically, a row is added to table 80 when the values of more than one trap varbind are used in filtering the varbind and value pairs of the SNMP trap message. Row 92 of table 80 stores configuration information that indicates a relationship between two rows 76 of table 60. Column 82 is an index column that stores an index value that is unique within column 82. Columns 84 and 86 are index columns that each store an index value that keys to a value stored by column 64 of table 60. Column 88 stores an operator type code similar to that of column 72 of table 60, may store the same types of values and may be mapped to the same values as described with respect to column 72 above. Column 90 may be utilized to manage the effective creation and deletion of conceptual rows 92 in table 80 in a manner similar to that of column 56 of table 50 and column 74 of table 60.

In operation, the information stored in tables 50, 60, and 80 are used in conjunction with each other. In one example, an operator causes SNMP manager 28 to send one or more SET commands to SNMP agent 40 that causes SNMP agent 40 to store at least a portion of the information included in tables 50, 60, and 80 within configuration data 42. That is, in this example, an operator used SNMP manager 28 to configure SNMP agent 40 with at least a linkDown trap, a linkUp trap, and a vrrpTrapAuthFailure trap and further configured SNMP agent 40 with a set of filter conditions to apply to the values of the varbinds associated with each of the configured traps.

For instance, when the vrrpTrapAuthFailure trap is triggered, SNMP agent 40 generates an SNMP trap message that includes the varbinds associated with the trap (e.g., vrrpTrapPacketSrc and vrrpTrapAuthErrorType). However, the operator may want to prevent SNMP trap messages from being sent to one or more of device management systems 22 when the varbinds associated with the trap include certain values. For example, if the operator determines that a device is configured incorrectly, the operator may wish to stop receiving SNMP trap messages triggered by the particular device's misconfiguration (e.g., an invalid authentication configuration).

In the example shown in FIGS. 3A-3C, the operator configured SNMP agent 40 and filter module 46 to prevent SNMP trap messages that are generated when the vrrpTrapAuthFailure trap is triggered by a device having the IP address of 192.168.3.5 and when the value of vrrpTrapErrorType is greater than the value 1 from being sent by SNMP agent 40. To configure SNMP agent 40 and filter module 46 in this manner, row 58C of table 50 stores a trap OID value of "vrrpTrapAuthFailure" in column 54 and the row status is set to "active," indicating that filter module 46 should filter the SNMP trap messages generated when the vrrpTrapAuthFailure trap is triggered by applying the filter criteria specified in table 60 and, if appropriate, in table 80.

Filter module 46 determines that the index value stored in column 52 of row 58C, the value 3, corresponds to the index value stored in column 62 of table 60 for two rows, rows 76C and 76D. Thus, filter module 46 applies the filter conditions specified by rows 76C and 76D to the SNMP trap message. Row 76C specifies a filter condition that causes filter module 46 to exclude SNMP trap messages that include the varbind OID vrrpTrapPacketSrc having a value of "192.168.3.5". Filter module 46 is configured in this manner by row 76C because value type of column 68 is set to the value "2", indicating that the value stored in column 70 in a string. Filter module 46 reads the string value stored in column 70 and applies the operator that corresponds to the operator code type stored in column 72, the "equal to" operator. Thus, when considering row 76C alone, filter module 46 prevents SNMP agent 40 from sending SNMP trap messages generated when the vrrpTrapAuthFailure trap is triggered if the SNMP trap messages include the varbind OID vrrpTrapPacketSrc set to the value "192.168.3.5".

Row 76D also specifies a filter condition that should be applied by filter module 46 to SNMP trap messages generated when the vrrpTrapAuthFailure trap is triggered. Filter module 46 determines that row 76D also needs to be applied because the value stored in column 52 of row 58C of table 50 also corresponds to the value stored in column 62 of row 76D of table 60. Row 76D configures filter module 46 to filter the SMNP trap messages generated when the vrrpTrapAuthFailure trap is triggered when the varbind OID "vrrpTrapAuthErrorType" (stored in column 66) includes an integer value (as indicated by the value stored in column 68) that is greater than (as indicated by the operator type code stored in column 72) the value 1 (as indicated by the value stored in column 70).

As shown in the example of FIGS. 3A-3C, the operator configured table 80 to indicate that there is a relationship between rows 76C and 76D. In particular, the index value stored in column 84 corresponds to the index value stored in row 76C of column 64 of table 60 and the index value stored in column 86 corresponds to the index value stored in row 76D of column 64 of table 60. Using the operator code type to operator example mapping described above in table 1, the operator type code "5" stored in column 88 of row 92 maps to the logical and operator. Thus, when filter module 46 applies the filter conditions specified by row 76C and 76D, filter module 46 combines the filter conditions as specified by the value stored in column 88 of row 92 of table 80 by performing a logical and operation between to two filter conditions. When the filter configuration information stored in tables 50, 60, and 80 is considered together, the filter configuration information configures filter module 46 to prevent SNMP trap messages from being sent when the SNMP trap messages are triggered by the vrrpTrapAuthFailure trap and include a vrrpTrapPacketSrc varbind OID having the value "192.168.3.5" and a vrrpTrapAuthErrorType varbind OID having a value that is greater than 1. In other words, SNMP agent 40 will send SNMP trap messages for the vrrpTrapAuthFailure trap when the vrrpTrapPacketSrc varbind OID is not equal to 192.168.3.5 and when the value of the vrrpTrapAuthErrorType varbind OID is any supported numerical value. SNMP agent 40 will also send the SNMP trap message for the vrrpTrapAuthFailure trap when the vrrpTrapPacketSrc varbind OID is equal to 192.168.3.5 and the value of the vrrpTrapAuthErrorType varbind OID is less than or equal to 1.

While FIGS. 3A-3C are shown as including row 92 of table 80, which defines a relationship between rows 76C and 76D, in other examples, table 80 may not include an entry that defines a relationship between two rows of table 60. In these other examples, filter module 46 applies the filter condition specified in row 76C to the trap to determine if the trap satisfies the filter condition specified in row 76C. If the filter condition specified in row 76C is satisfied, filter module 46 drops the trap. If the filter condition specified in row 76C is not satisfied, filter module 46 applies the filter condition specified in row 76D to the trap to determine if the trap satisfies the filter condition specified in row 76D. If the filter condition specified in row 76D is satisfied, filter module 46 drops the trap. Otherwise, SNMP agent 40 sends the trap message to device management system 22A.

In general, when table 60 includes more than two filter conditions for a particular trap OID specified in a row of table 50, each filter condition should be applied to the trap prior to SNMP agent 40 sending the trap to device management system 22A. Furthermore, table 80 may include more than one row and each row of table 80 may specify a relationship between rows of table 60. When two or more rows of table 80 specify relationships between multiple different rows of table 60, filter module 46 applies the combination of filter criteria to the trap, as described above, and, if none of the filter criteria are met, SNMP agent 40 sends the trap to device management system 22A.

Figure 4:
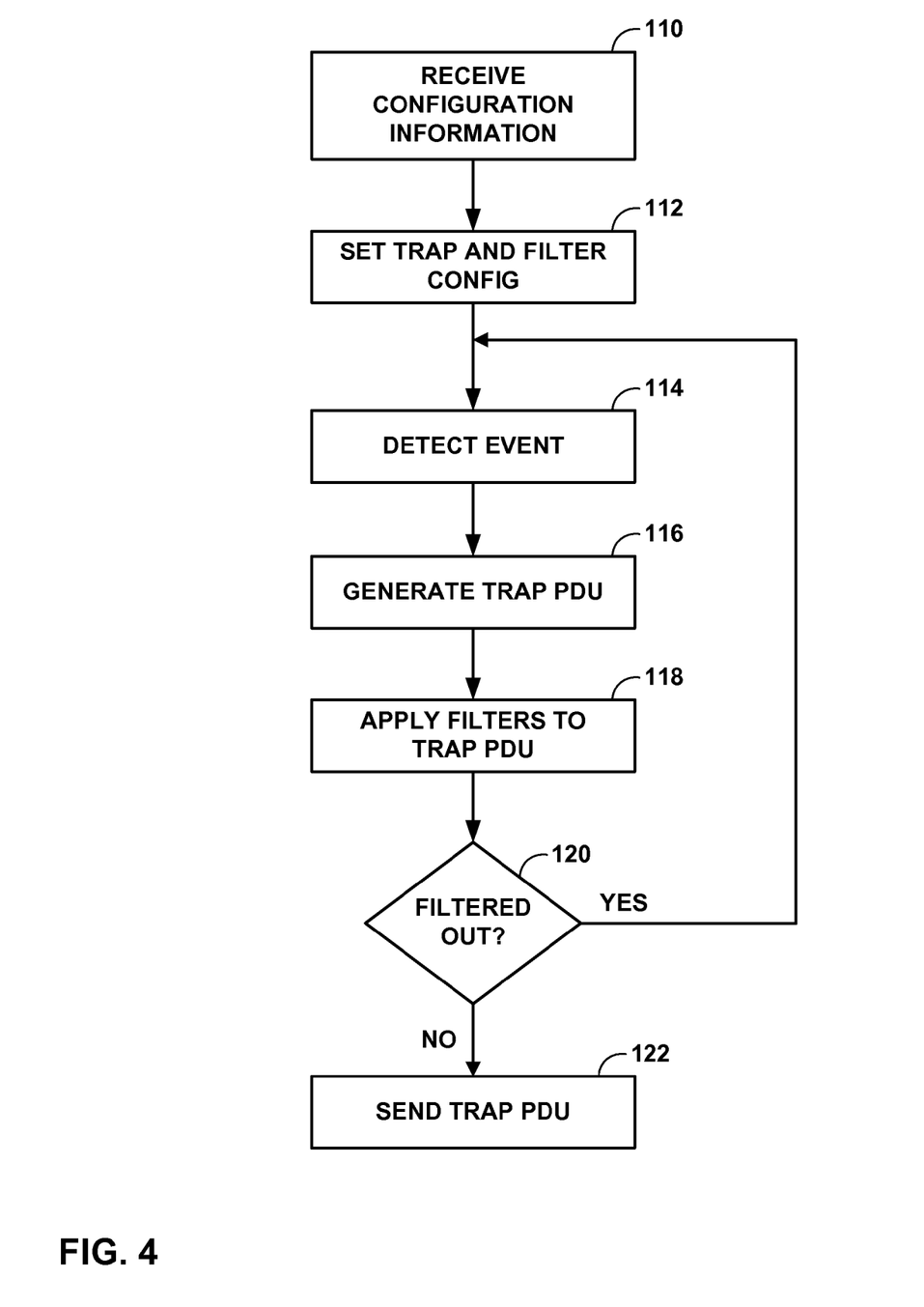
FIG. 4 is a flowchart illustrating an example method for filtering event information in accordance with one or more aspects of this disclosure.

FIG. 4 is a flowchart illustrating an example method for filtering event information in accordance with one or more aspects of this disclosure. The method illustrated in FIG. 4 will be described with respect to device management systems 22 and managed device 24, both illustrated in FIG. 2, and tables 50, 60, and 80 illustrated in FIGS. 3A-3C, respectively.

Device 24 receives configuration information from one of device management systems 22 (e.g., device management system 22A) (110). In one example, device management system 22A sends an SNMP SET message to device 24. Device 24 receives the SET message and SNMP agent 40 extracts the configuration information stored in the variable bindings of the message. The configuration information configures SNMP agent 40 and filter module 46 to filter SNMP trap messages generated by SNMP agent 40. In one example, the filter configuration information defines matching criteria for undesired information (i.e., information to be discarded). SNMP agent 40 stores the configuration information in configuration data 42 (112). In general, the configuration information received from device management system 22A includes one or more trap OIDs and one or more filter conditions for each trap OID used by filter module 46 to filter generates SNMP trap messages. Each filter condition typically includes a varbind OID, a filter value, and a filter operator. In one example, the configuration information set to device 24 via one or more SNMP SET message includes the configuration information shown in tables 50, 60, and 80.

SNMP agent 40 determines that an event that satisfies one or more trap conditions has occurred (114), which causes the corresponding trap to be triggered by SNMP agent 40. In triggering the corresponding trap, SNMP agent 40 generates a trap PDU that includes varbind and value pairs associated with the triggered trap OID (116). For example, if the trap OID triggered by the detected event is the linkDown trap OID (as shown in row 58A of table 50 of FIG. 3A), the generated trap PDU may include the varbinds ifIndex, ifAdminStatus, and ifOperStatus, as examples. Each varbind include in the trap PDU has a corresponding value.

Filter module 46 reads the filter configuration information stored in configuration data 42 and tables 50, 60, and 80 and applies the configured filters to the trap PDU (118). In the example of FIGS. 3A-3C, the linkDown trap OID is filtered on the ifName varbind OID as configured in row 76A of table 60 that includes the filter value "fe-1/0/3" and the operator type code that maps to the "not equal" operator. Thus, the filter configuration information configures filter module 46 to prevent SNMP agent 40 from sending trap PDUs generated by the triggering of the linkDown trap OID when the ifName varbind OID includes any value other than "fe-1/0/3". In other words, filter module 46 will suppress linkDown traps for all interfaces other than fe-1/0/3.

If the trap PDU includes varbind values that are filtered out ("YES" branch of 120), SNMP agent 40 does not send the trap PDU and waits until SNMP agent 40 detects another event (114) that triggers a trap. If the trap PDU does not include varbind values that match the configured filters ("NO" branch of 120), SNMP agent 40 sends the trap PDU to one or more device management systems 22 (122). The network address for the device management systems may be stored in configuration data 42. In some examples, the filter configuration information may cause a trap PDU to be sent to one device management system 22 (e.g., device management system 22N), but not sent to a different device management system 22 (e.g., device management system 22A).

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, (e.g., non-transitory media) and not signals, carrier waves, or other transient media.

Various embodiments have been described. These and other embodiments are within the scope of the following claims.

The invention claimed is:

1. A method comprising:
receiving a set of configuration information, with a simple network management protocol agent executing on a network device, wherein the set of configuration information specifies one or more trap conditions and one or more filter criteria, and wherein each of the one or more filter criteria specifies a variable identifier, a variable value associated with the variable identifier, and an operator, wherein the operator corresponds to one of a mathematical operator, a logical operator, and a regular expression operator;
detecting, with the simple network management protocol agent, that at least one of the one or more trap conditions is met;
responsive to detecting the at least one of the one or more trap conditions, generating, with the simple network management protocol agent, a message based on the at least one trap condition that is met, wherein the message includes a set of variable identifiers and associated variable values from a management information base (MIB) storing configuration information for the network device;
determining, with the simple network management protocol agent, whether at least one of the variable identifiers and associated value pairs included in the message meet at least one of the one or more filter criteria by at least comparing the variable value associated with the variable identifier of a respective filter criteria to the variable value associated with the variable identifier of the message that corresponds to the variable identifier of the respective filter criteria in a manner consistent with the operator; and
selectively sending, by the network device, the message to a device management system based on the determination.

2. The method of claim 1, wherein selectively sending the generated message to the device management system based on the determination comprises:
when none of the one or more filter criteria applied to the generated message are met, sending the generated message to the device management system; and
when at least one of the one or more filter criteria applied to the generated message is met, discarding the generated message.

3. The method of claim 1, wherein selectively sending the generated message to the device management system based on the determination comprises:
when none of the one or more filter criteria applied to the generated message are met, discarding the generated message; and
when at least one of the one or more filter criteria applied to the generated message is met, sending the generated message to the device management system.

4. The method of claim 1,
wherein the set of configuration information further specifies a particular device management system to which the simple network management protocol agent is to send the message, and
wherein selectively sending the message comprises selectively sending the message to the particular device management system based at least on the configuration information.

5. The method of claim 1, wherein each of the one or more trap conditions is associated with one or more variable identifiers of the set of variable identifier and associated variable values.

6. The method of claim 1, wherein each of the one or more filter criteria further specifies a trap condition.

7. The method of claim 6, further comprising:
identifying a portion of the one or more filter criteria to use when determining whether one variable identifier and value pair of the set of variable identifier and value pairs included in the generated messages meet at least one of the one or more filter criteria by at least comparing the trap condition specified in each of the one or more filter criteria to each of the at least one of the one or more trap conditions determined to be met.

8. The method of claim 6, wherein the variable value associated with the variable identifier specified by at least one of the one or more filter criteria has a value type of a string or an integer.

9. The method of claim 1, wherein the one or more filter criteria includes at least three filter criteria, wherein a first filter criteria of the at least three filter criteria specifies one of the one or more trap conditions, a first variable identifier, a first value, and a first operator, wherein a second filter criteria of the at least three filter criteria specifies the one of the one or more trap conditions, a second variable identifier, a second value, and a second operator, and wherein a third filter criteria of the at least three filter criteria specifies the one of the one or more trap conditions and a third operator.

10. The method of claim 9, wherein determining, with the simple network management protocol agent, whether one variable identifier and value pair of the set of variable identifier and value pairs included in the generated messages meet at least one of the one or more filter criteria further comprises:
filtering the set of variable identifiers and associated values based at least in part on the first variable identifier, the first value, and the first operator specified by the first filter criteria to generate a first set of filtered variable identifiers and associated values;
filtering the set of variable identifiers and associated values based at least in part on the second variable identifier, the second value, and the second operator specified by the second filter criteria to generate a second set of filtered variable identifiers and associated values; and
combining the first set of filtered variable identifiers and associated values with the second set of filtered variable identifiers and associated values based on the third operator specified by the third filter criteria.

11. The method of claim 1,
wherein each respective filter criterion of the one or more filter criteria specifies a respective variable identifier, a respective value, and a respective operator, and
wherein the method further comprises, for each respective filter criterion of the one or more filter criteria, filtering the set of variable identifiers and associated value based at least in part on the respective variable identifier, the respective value, and the respective operator specified by the respective filter criterion.

12. The method of claim 1,
wherein the message comprises an SNMP trap protocol data unit (PDU) output from the network device to the device management system.

13. A network device comprising:
a processor that provides an execution environment for a simple network management protocol agent; and
a data repository configured to store configuration information,
wherein the simple network management protocol agent is operable to:
retrieve a set of configuration information from the data repository, wherein the configuration information specifies one or more trap conditions and one or more filter criteria, and wherein each of the one or more filter criteria specifies a variable identifier, a variable value associated with the variable identifier, and an operator, wherein the operator corresponds to one of a mathematical operator, a logical operator, and a regular expression operator;
detect that at least one of the one or more trap conditions is met;
responsive to detecting the at least one of the one or more trap conditions, generate an asynchronous message based on the at least one trap condition that is met, wherein the asynchronous message includes a set of variable identifiers and associated variable values from the data repository;
determine whether at least one of the variable identifiers and associated value pairs included in the asynchronous message meet at least one of the one or more filter criteria by at least comparing the variable value associated with the variable identifier of a respective filter criteria to the variable value associated with the variable identifier of the asynchronous message that corresponds to the variable identifier of the respective filter criteria in a manner consistent with the operator; and
selectively send the asynchronous message to a device management system based on the determination.

14. The device of claim 13,
wherein the set of configuration information further specifies a particular device management system to which the simple network management protocol agent is to send the asynchronous message, and
wherein the simple network management protocol agent is operable to selectively send the asynchronous message to the particular device management system based at least on the configuration information.

15. The device of claim 13, wherein each of the one or more filter criteria further specifies a trap condition.

16. The device of claim 15, wherein the simple network management protocol agent is further operable to identify a portion of the one or more filter criteria to use when determining whether one variable identifier and value pair of the set of variable identifier and value pairs included in the asynchronous message meet at least one of the one or more filter criteria by at least comparing the trap condition specified in each of the one or more filter criteria to each of the at least one of the one or more trap conditions determined to be met.

17. The device of claim 13, wherein the one or more filter criteria includes at least three filter criteria, wherein a first filter criteria of the at least three filter criteria specifies one of the one or more trap conditions, a first variable identifier, a first value, and a first operator, wherein a second filter criteria of the at least three filter criteria specifies one of the one or more trap conditions, a second variable identifier, a second value, and a second operator, and wherein a third filter criteria of the at least three filter criteria specifies the one of the one or more trap conditions and a third operator.

18. The device of claim 17, wherein the simple network management protocol agent is operable to determine whether one variable identifier and value pair of the set of variable identifier and value pairs included in the asynchronous message meet at least one of the one or more filter criteria by at least being operable to filter the set of variable identifiers and associated values based at least in part on the first variable identifier, the first value, and the first operator specified by the first filter criteria to generate a first set of filtered variable identifiers and associated values, filter the set of variable identifiers and associated values based at least in part on the second variable identifier, the second value, and the second operator specified by the second filter criteria to generate a second set of filtered variable identifiers and associated values, and combine the first set of filtered variable identifiers and associated values with the second set of filtered variable identifiers and associated values based on the third operator specified by the third filter criteria.

19. The device of claim 13,
wherein each respective filter criterion of the one or more filter criteria specifies a respective variable identifier, a respective value, and a respective operator, and
wherein the simple network management protocol agent is operable to, for each respective filter criterion of the one or more filter criteria, filter the set of variable identifiers and associated value based at least in part on the respective variable identifier, the respective value, and the respective operator specified by the respective filter criterion.

20. A computer-readable storage medium encoded with instructions that cause one or more programmable processors of a network device to:
receive, with a simple network management protocol agent, a set of configuration information that specifies one or more trap conditions and one or more filter criteria, wherein the set of configuration information specifies one or more trap conditions and one or more filter criteria, and wherein each of the one or more filter criteria specifies a variable identifier, a variable value associated with the variable identifier, and an operator, wherein the operator corresponds to one of a mathematical operator, a logical operator, and a regular expression operator;
detect, with the simple network management protocol agent, that at least one of the one or more trap conditions is met;
responsive to detecting the at least one of the one or more trap conditions, generate, with the simple network management protocol agent, a message based on the at least one trap condition that is met, wherein the message includes a set of variable identifiers and associated variable values from a management information base (MIB) storing configuration information for the network device;
determine, with the simple network management protocol agent, whether at least one of the variable identifiers and associated value pairs included in the message meet at least one of the one or more filter criteria by at least comparing the variable value associated with the variable identifier of a respective filter criteria to the variable value associated with the variable identifier of the message that corresponds to the variable identifier of the respective filter criteria in a manner consistent with the operator; and selectively send, with the simple network management protocol agent, the message from the network device to a device management system based on the determination.

* * * * *